United States Patent Office 3,301,598
Patented Jan. 31, 1967

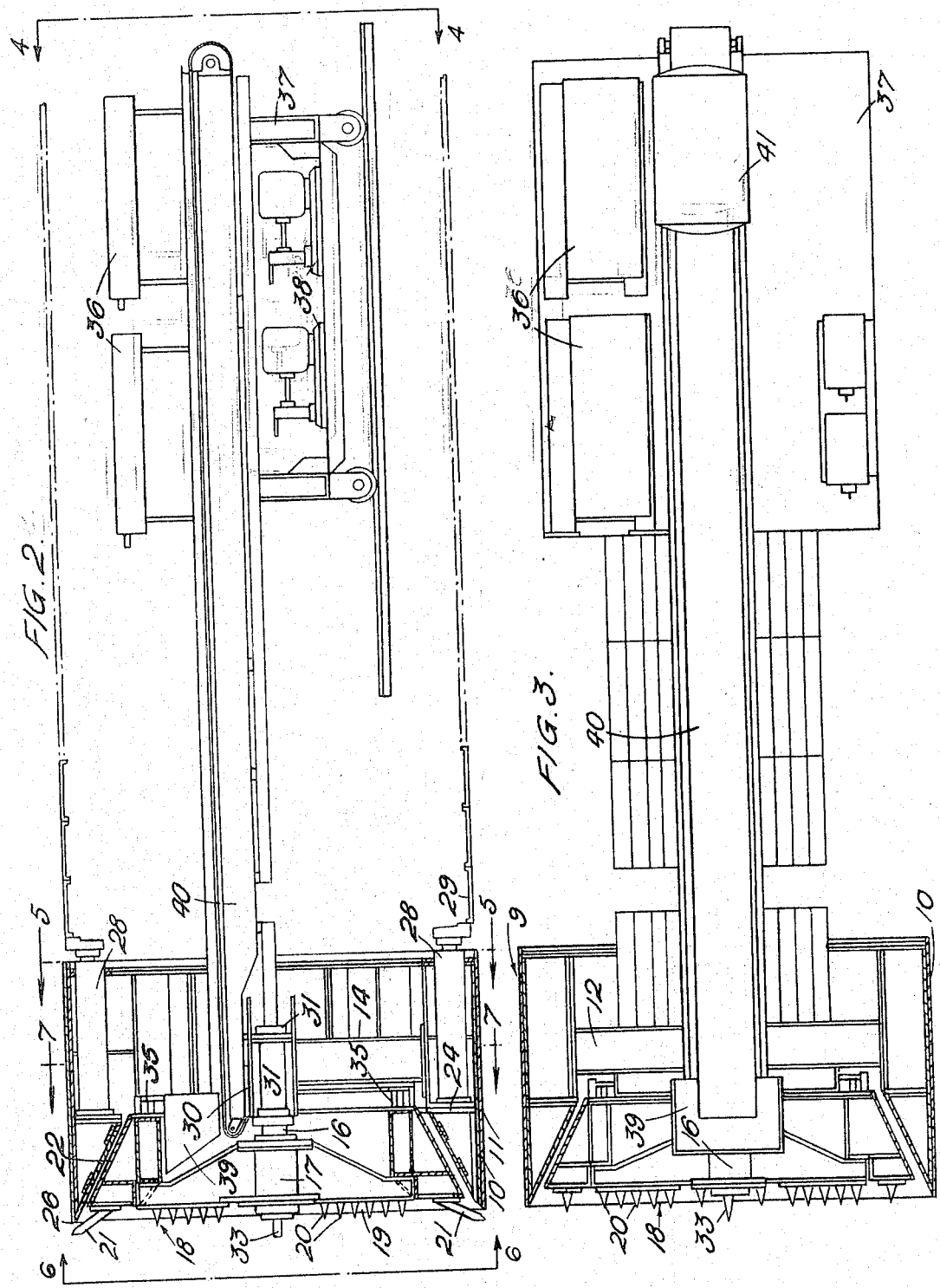

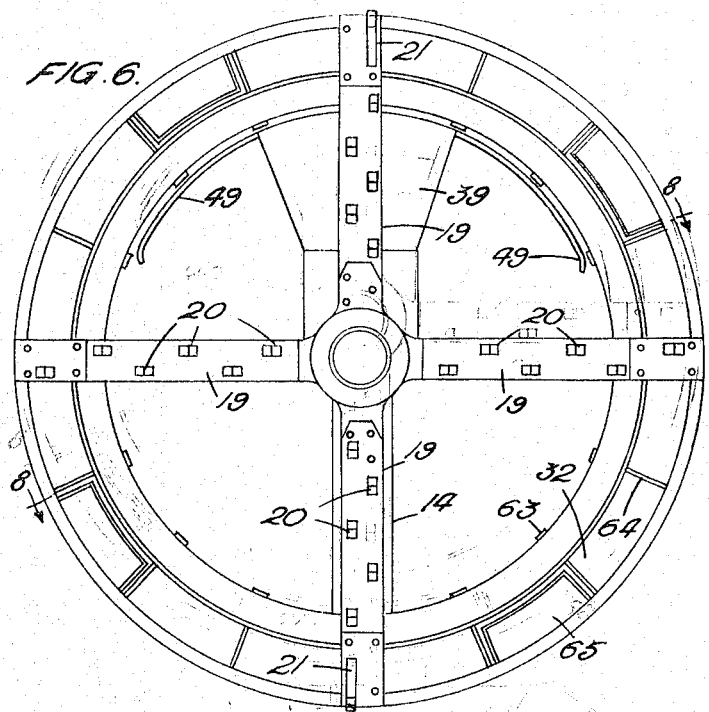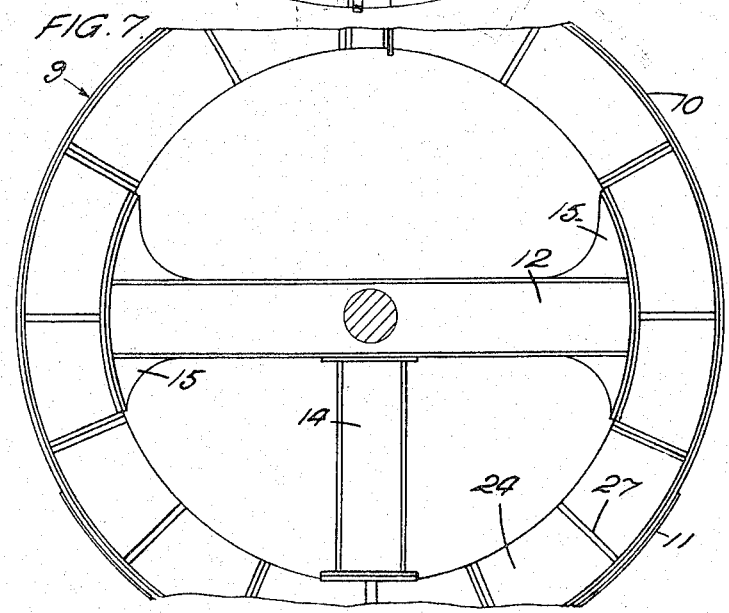

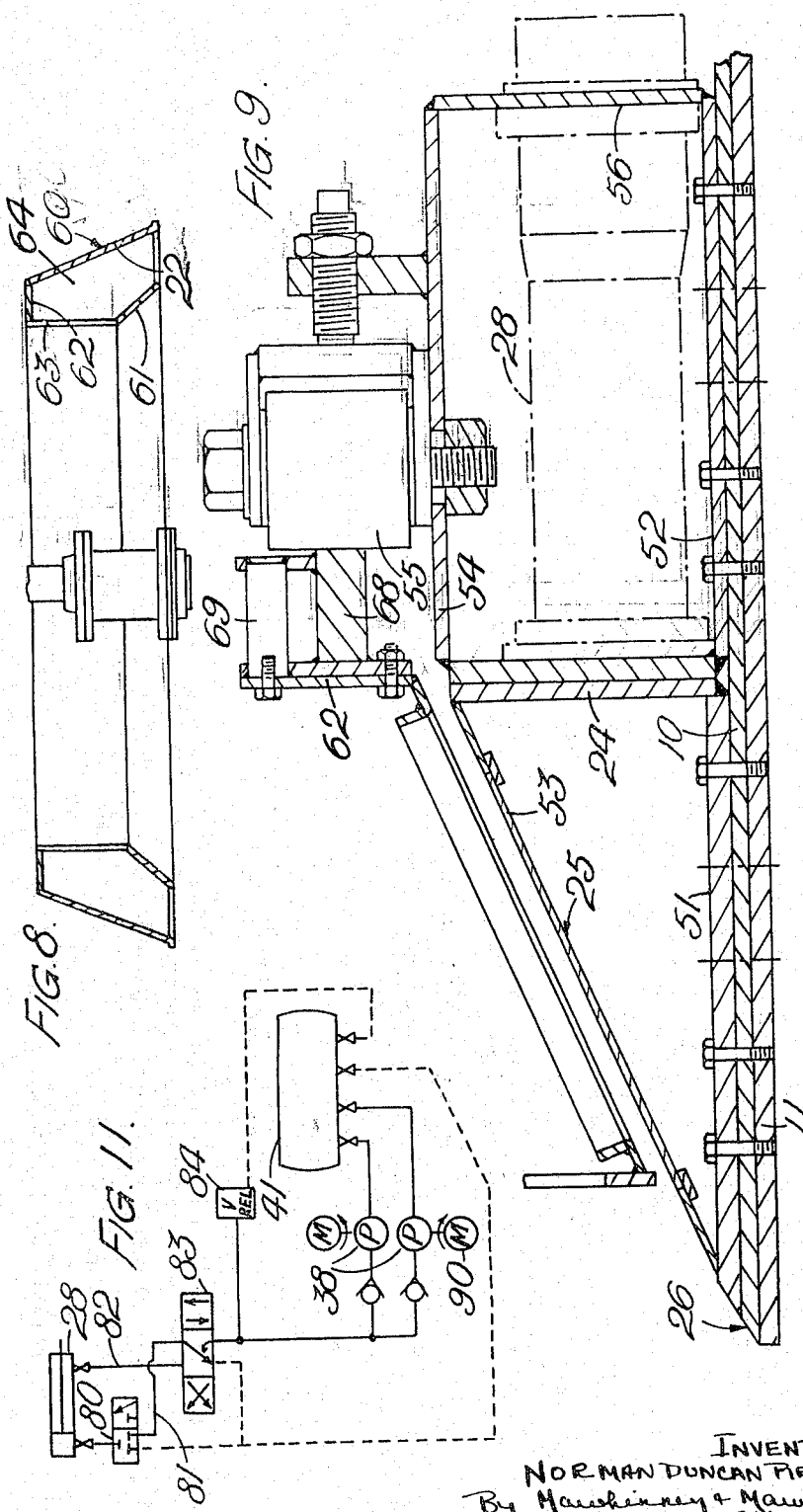

3,301,598
TUNNEL BORING MACHINE HAVING ROTATION CONTROL RESPONSIVE TO ADVANCE PRESSURE
Norman Duncan Pirrie, Sutton, and John Bland, Epping, England, assignors to Economic Foundations Limited, London, England, a British company
Original application June 27, 1963, Ser. No. 291,118. Divided and this application Nov. 12, 1965, Ser. No. 507,314
8 Claims. (Cl. 299—1)

This application is a divisional of our co-pending United States application Serial No. 291,118, filed June 27, 1963 for "Tunnel Boring Machines."

The invention relates to tunnel boring machines suitable for boring through clay and the like and of the kind comprising a cutting head, means for mounting the cutting head for rotation to cut a tunnel face and means for advancing the cutting head along a tunnel as tunnelling proceeds.

The invention provides a tunnel boring machine of the kind described in which there is a first hydrostatic system for advancing the cutting head, a second hydrostatic system for rotating the cutting head, and means operable in response to a predetermined hydrostatic pressure in the second system, to unload the first system.

Preferably there is means operable in response to a second predetermined hydrostatic pressure in the second system to unload the second system, the second predetermined pressure being greater than the first predetermined pressure.

It is further preferred that the cutting head is mounted on a shield for rotation relative thereto and for axial movement therewith.

In one embodiment the first hydrostatic system comprises rams acting between the shield and the tunnel (e.g. a lining already erected in the tunnel). The rams may be connected together in parallel and each ram or group of rams provided with its own on/off control.

Preferably the rams are all connected to a single valve which controls the direction of operation of the rams.

In a further embodiment the second hydrostatic system comprises hydraulic motors mounted on the shield and operable to rotate the cutting head.

There may be means to reverse the direction of rotation of the cutting head (e.g. a reversing valve in the supply to the cutting head).

It is preferred that the motors are supplied by a hydraulic pump, or pumps, there is means to provide a boost pressure for the pump and there is means to prevent operation of the pump until a predetermined boost pressure has been reached.

Figure 1:
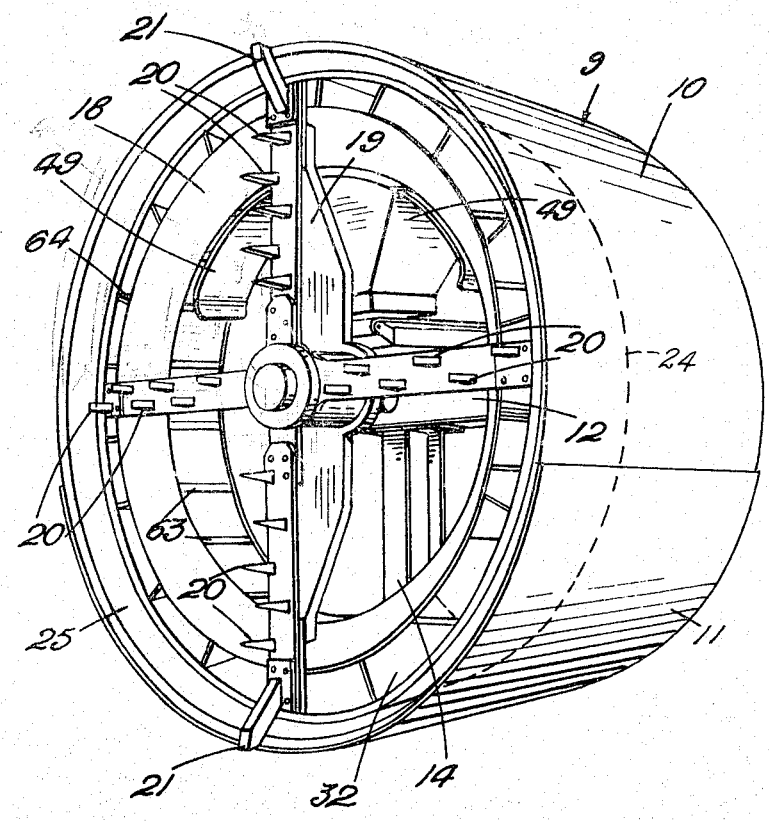
Figure 4:
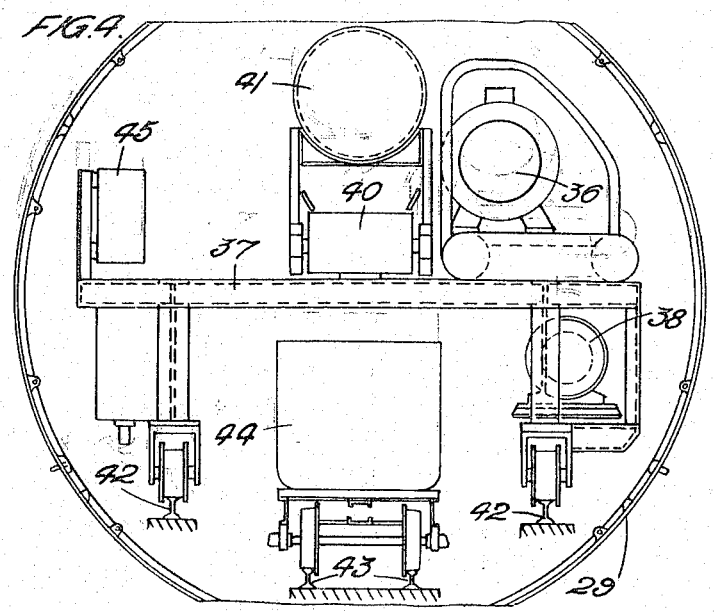
Figure 5:
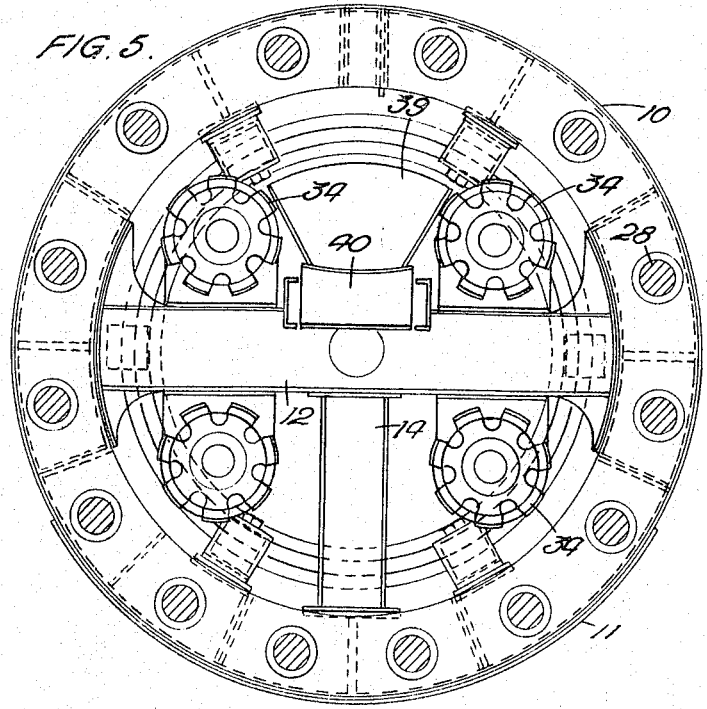
Figure 10:
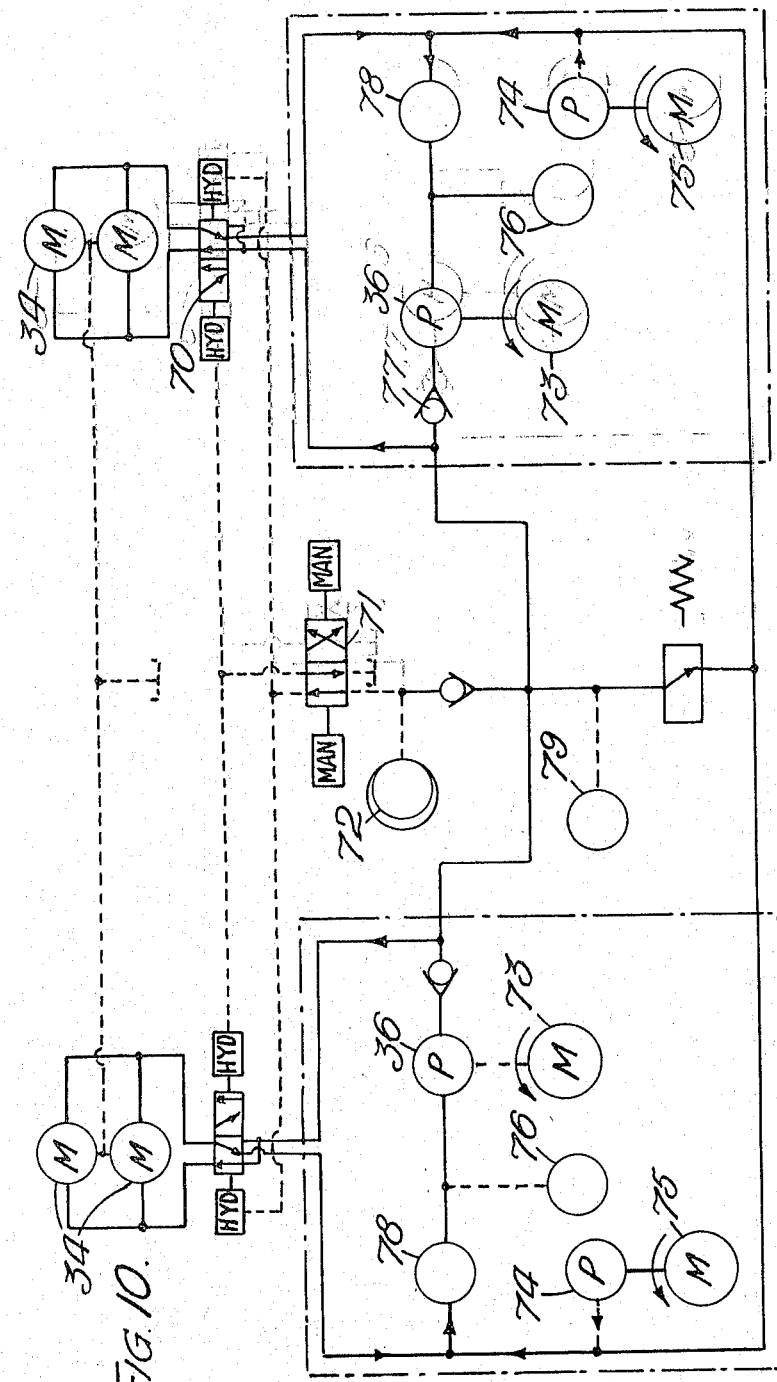

A specific construction of a tunnel boring machine according to the invention will now be described with reference to the accompanying drawings in which:

FIGURE 1 is a perspective view of the machine,
FIGURE 2 is a sectional elevation of the machine with parts removed for the sake of clarity,
FIGURE 3 is a sectional plan of the machine,
FIGURE 4 is a view in the direction 4—4 in FIGURE 2,
FIGURE 5 is a view in the direction 5—5 in FIGURE 2, with parts omitted for clarity,
FIGURE 6 is a view of the cutting head in the direction 6—6 in FIGURE 2,
FIGURE 7 is a part sectional view of the cutting head in the direction 7—7 in FIGURE 2, with parts omitted for clarity,
FIGURE 8 is a sectional view in the direction 8—8 in FIGURE 6,
FIGURE 9 is an enlarged view of part of FIGURE 2 showing details of the cutting head and the shield, and FIGURES 10 and 11 are schematic diagrams of the hydraulic circuits to the motors and the rams respectively.

The machine comprises a shield 9 and a cutting head 18 mounted on the shield for rotation.

The shield comprises a cylindrical skin plate 10 with a sole plate 11 extending around the lowest 120° of its periphery. There is within the skin plate 10 a reinforcing ring 24 positioned intermediate in the length of the skin plate 10 and the skin plate is reinforced by a plurality of segments 51 and 52 extending in succession around the skin plate on either side of the ring 24.

A frusto-conical member 25 extends forwardly from the ring 24 and there are removable plates 53 in the member for access to pipe lines or the like in the space formed between the segments 51 and the member 25.

The forward edges of the skin plate and the segments are tapered to form a cutting edge for the shield.

Mounting plates 54 extend rearwardly from the ring 24 and are supported at their rear edges by plates 56 extending inwardly from the segments 52. Reaction rollers 55 are mounted for rotation in roller assemblies attached to the mounting plates 54 and the roller assemblies are adjustable axially of the shield.

The ring 24 is reinforced by gusset plates 27 and there is a horizontal beam 12 extending across the shield. There are gusset plates 15 at the ends of the horizontal beam to provide a large bolting area and to reduce the stress concentration. There is also a vertical beam 14 extending between the bottom of the cylinder and the horizontal beam.

The shield is moved forwards by hydraulic rams 28 which bear on the ring 24 and the tunnel lining 29 and the rams are driven by hdraulic pumps 38 mounted on a carriage 37 in the tunnel.

A housing 30 is formed in the horizontal beam and the housing carries two supoprts 31 for a fixed shaft 16. Rotatable on the shaft 16 is a hub 17 of the cutting head 18.

The cutting head 18 comprises four beams or spokes 19 radiating from the hub 17 and an outer annulus 22 attached to the ends of the spokes.

The annulus comprises an outer annular plate 60 which extends the length of the annulus and an inner annular plate 61. An inner ring 62 is welded to the back of the plate 60 and the plate 61 is supported on the ring by a number of ribs 63 and corresponding spacer plates 64. The spacer plates 64 divide the annulus into a series of compartments or buckets 32.

There are four openings 65 in the plate 60 as shown in FIGURE 6. Scraper blades are mounted at the sides of the openings to lie parallel to the axis of rotation of the cutting head. In use the scraper blades scrape against the member 25 to remove any cuttings from the space between the annulus 28 and the shield. There may be rubber wiper blades at the ends of the scraper blades.

At the back of the annulus there is a reaction ring 68 attached to the inner ring 62. The reaction ring runs on the reaction rollers 55. The reaction ring and rollers take all the axial thrust of the annulus. There is a succession of pins 69 around the inside of the reaction ring 68 forming a pin wheel 35.

An important feature of the cutting head is that because of its construction it can be dismounted and assembled in situ through the shield.

The cutting head is driven by four radial piston hydraulic motors 34 mounted on the shield. Pinions (not shown) in their own bearings are driven by flexible drives from the motors and drive the pin wheel 35 formed on the cutting head. The hydraulic motors 34 are driven by jumps 36 also mounted on the carriage 37.

The cutting head is operable to cut a tunnel in either direction of rotation since it has cutters which will cut in either direction of rotation and since the scraper blades can be mounted on either side of the openings 65. The motors 34 are reversible to effect such rotation. One advantage of two-way rotation is, that roll of the machine can easily be corrected.

The shield carries also a collecting hopper 39 and the front ends of a belt conveyor 40 onto which the hopper is directed. The rear end of the conveyor is mounted on the carriage 37. There are shedder plates 49 on either side of the hopper 39 to prevent cuttings falling out of the buckets before reaching the hopper.

The carriage carries an oil reservoir 41 for the hydraulic rams and also the electrical control gear 45 for the machine.

The carriage runs on rails 42 at the sides of the tunnel and there is a second set of rails 43 between the carriage rails. Skips 44 run on the rails 43.

The hydraulic system will now be described.

The hydraulic circuit to the motors 34 which drive the cutting head is shown in FIGURE 10.

The motors 34 are arranged in two pairs, each connected in parallel with a pump 36 driven by a motor 73. Each pump 36 has in its circuit an auxiliary pump 74 driven by a motor 75 to create a boost pressure in the circuit. The pumps 36 are so arranged that they cannot be operated until the back pressure has built up to a predetermined value, detected by a pressure switch 76, to prevent cavitation. The back pressure created is about 100 p.s.i.

The pumps 36 supply fluid at a pressure of about 2400 p.s.i. to the motors 34 by means of one-way valves 77 and servo-operated reversing valves 70. The reversing valves 70 each have two positions—to drive the motors in the forward and reverse directions—and the two valves 70 are operated in synchronism by a manually operated valve 71. The valve 71 is a reversing valve connected to the supply pressure from the pumps 36 and to the valves 70 by means of a circuit shown in chained lines. When the valve 71 is in the position shown in FIGURE 10 the valves 70 are held in the positions shown, but when the valve 71 is moved manually to the left the supply of hydraulic pressure to the valves 70 is reversed around the valves 70 outwardly away from one another in FIGURE 10. This reverses the supply to the motors 34 to reverse the direction of rotation. There is an accumulator 72 in the circuit to the valves 71 so that the valve 70 can be operated when the pumps 36 are inoperative.

The fluid returns to the pump 36 by means of a filter 78.

Each pump 36 is fitted with a stall valve which unloads the pump at a predetermined maximum pressure to avoid overloading the cutting head.

The two pumps 36 are interconnected as shown and there is a detector 79 to detect the pressure in the circuit.

The hydraulic circuit to the rams is shown diagrammatically in FIGURE 11.

The rams 28 are arranged in parallel on two supply lines 81, 82. Each ram is double acting and has its own on-off valve 80. The two supply lines are fed from a main control valve 83 which has three settings, forward, neutral and reverse in the motor circuit. The valve 83 may be servo-operated in a manner similar to the valves 70 controlling the motors 34.

The main control valve 83 is fed from the two pumps 38 in parallel via an unloading valve 84. The pumps are driven by electric motors 90. The unloading valve 84 is controlled by the detector 79 in the fluid circuit of motors 34 in such a manner that if the pressure in the motor circuit exceeds a predetermined safe pressure (e.g. because the rams have been advanced too quickly) the unloading valve 84 is operated to unload the ram circuit. The detector operates to load the ram circuit at a lower pressure of the motor circuit than that required to unload the ram circuit. Further the ram circuit is unloaded by the detector at a lower pressure than that at which the stall valve on the pump 36 operates to unload the pump.

The return feed from the control valve 83 passes to the pumps 38 by means of the reservoir 41.

The operation of the machine will now be described.

The cutting head is adjusted so that the outer cutters 21 make a cut of which the lowest point is level with the sole plate 11. This means that the machine will overcut the diameter of the cylinder 10 thus reducing the skin friction between the cylinder and the tunnel wall but there will be no undercut so that the machine will keep on the same level as it moves forward.

With the cutting head rotating by means of the pumps 36 and the motors 34 the shield and hence the cutting head are advanced slowly forward by means of the pumps 38 and the rams 28. The carriage 37 advances with the shield.

Cuttings from the tunnel face are directed by the cutting members 20 into the buckets 32, which carry the cuttings upwardly and deliver them into the hopper 39. From the hopper the cuttings pass onto the conveyor 40 which carries them rearwardly and finally deposits them in the skip 44 waiting below the carriage 37.

When the rams 28 have been fully extended they are retracted while the shield remains still and further segments of the tunnel lining are put in place. The rams now bear on the new lining and the machine moves forward once again.

The tunnel may be lined conveniently by using the tunnel lining machine described in our patent application Serial No. 223,750 now Patent No. 3,232,062 or by any other conventional method.

One convenient method of operating the machine is to drive the cutting head in opposite directions of rotation for alternate strokes of the rams. This avoids the machine rolling over to one side.

The reversing of the rotation of the cutting head is particularly useful to reverse the head out of an obstruction in the tunnel face.

Advantages of the hydrostatic transmission system as compared with the usual mechanical drives by electric motors are that the power units are remote from the body of the machine, the speed of rotation of the cutting head can be varied over a considerable range (from 1 to 6 revolutions per minute) without loss of torque, the simple reversing mechanism, and the stall devices to prevent damage to the machine.

It is within the scope of the invention to omit the sole plate from the machine, in which case the cutters would still overcut the shield but the machine would be driven through the tunnel in the "look-up" position (i.e. with the lowest point of the shield in advance of the highest point).

An alternative arrangement of the machine also omitting the sole plate is to make the diameter of the cutting end of the shield greater than the diameter of the rest of the shield. In this way skin friction on the rest of the shield is reduced.

We claim:
1. A tunnel boring machine of the kind comprising a shield, a cutting head mounted on the shield for rotation relative thereto and for axial movement therewith, a first hydraulic system acting between the shield and tunnel for advancing the cutting head along the tunnel as tunnelling proceeds, a second hydraulic system comprising hydraulic motors mounted on the shield and operable to rotate the cutting head, and hydraulic fluid control means operable in response to a predetermined hydrostatic pressure in the second system to unload the first system.

2. A tunnel boring machine as claimed in claim 1 in which there is means operable in response to a second pre-determined hydrostatic pressure in the second system to unload the second system, the second predetermined pressure being greater than the first predetermined pressure.

3. A tunnel boring machine as claimed in claim 1 in which there is means to reverse in a direction of rotation of the cutting head (e.g. a reversing valve in the supply to the cutting head).

4. A tunnel boring machine as claimed in claim 1 in which the motors are supplied by a hydraulic pump means, there is means to provide a boost pressure for the pump means and there is means to prevent operation of the pump means until a predetermined boost pressure has been reached.

5. A tunnel boring machine as claimed in claim 1 in which the first hydraulic system comprises rams connected together in parallel and each ram is provided with its own on/off control.

6. A tunnel boring machine as claimed in claim 5 in which the rams are all connected to a single valve which controls the direction of operation of the rams.

7. A tunnel boring machine as claimed in claim 1 having a reversible hydraulic means for rotating the cutting head and last mentioned means.

8. A tunnel boring machine comprising a shield for engagement with the tunnel wall, a cutting head mounted on the shield for rotation, means on the head to cut the tunnel face, double acting hydraulic rams engageable between the shield and the tunnel for advancing the shield, a first hydrostatic system to supply hydrostatic pressure to the rams in parallel in the direction to advance or retract the cutting head, an on/off control for each ram, reversible hydraulic motors mounted on the shield and engageable with the head to rotate the head, a second hydrostatic system to supply hydrostatic pressure in series to the motors to rotate the head in either direction, which system comprises hydraulic pumps, means to provide a boost pressure for each pump and means to prevent operation of the pump until a predetermined boost pressure has been reached and means operable in response to a predetermined hydrostatic pressure in the second system to unload the first system.

References Cited by the Examiner

UNITED STATES PATENTS

| 1,689,596 | 10/1928 | Osgood | 173—6 |
| 3,075,591 | 1/1963 | Pirrie et al. | 175—62 X |

FOREIGN PATENTS

| 270,014 | 5/1927 | Great Britain. |
| 762,416 | 11/1956 | Great Britain. |

ERNEST R. PURSER, *Primary Examiner.*